(12) United States Patent
Cho et al.

(10) Patent No.: US 12,346,424 B2
(45) Date of Patent: Jul. 1, 2025

(54) APPARATUS AND METHOD FOR ISSUING DELEGATED CREDENTIALS IN DECENTRALIZED IDENTIFIER-BASED SERVICE

(71) Applicant: ELECTRONICS AND TELECOMMUNICATIONS RESEARCH INSTITUTE, Daejeon (KR)

(72) Inventors: Kwan-Tae Cho, Daejeon (KR); Sang-Rae Cho, Chungcheongbuk-do (KR); Geon-Woo Kim, Daejeon (KR); Seok-Hyun Kim, Daejeon (KR); Soo-Hyung Kim, Daejeon (KR); Young-Sam Kim, Daejeon (KR); Jong-Hyouk Noh, Daejeon (KR); Young-Seob Cho, Daejeon (KR); Jin-Man Cho, Daejeon (KR); Seung-Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 588 days.

(21) Appl. No.: 17/857,733

(22) Filed: Jul. 5, 2022

(65) Prior Publication Data
US 2023/0103021 A1    Mar. 30, 2023

(30) Foreign Application Priority Data
Sep. 29, 2021    (KR) .......................... 10-2021-0129196

(51) Int. Cl.
*G06F 21/33*    (2013.01)
*G06Q 20/36*    (2012.01)

(52) U.S. Cl.
CPC .............. *G06F 21/33* (2013.01); *G06Q 20/36* (2013.01)

(58) Field of Classification Search
CPC ...... G06F 21/33; G06Q 20/36; G06Q 20/363; G06Q 20/3821; H04L 63/0884; H04L 63/0815
See application file for complete search history.

(56) References Cited

U.S. PATENT DOCUMENTS

| | | | |
|---|---|---|---|
| 11,050,745 B2 | 6/2021 | Tanaka et al. | |
| 11,507,943 B1* | 11/2022 | Ashley .................. | G06Q 20/36 |

(Continued)

FOREIGN PATENT DOCUMENTS

| | | |
|---|---|---|
| KR | 10-0864367 B1 | 10/2008 |
| KR | 10-0929488 B1 | 12/2009 |

(Continued)

*Primary Examiner* — Amie C. Lin
(74) *Attorney, Agent, or Firm* — Rabin & Berdo, P.C.

(57) ABSTRACT

Disclosed herein are an apparatus and method for issuing delegated credentials between digital wallets possessed by multiple users connected to a Decentralized Identifier (DID) registry through wired/wireless communication. The method includes receiving, by a digital wallet of a first user, a delegated credential issuance request message including a newly created DID document from a digital wallet of a second user, generating, by the digital wallet of the first user, a delegated credential using both the delegated credential issuance request message, received from the digital wallet of the second user, and an original credential, previously issued by the digital wallet of the first user, and transmitting, by the digital wallet of the first user, the generated delegated credential and the original credential, together with a delegated credential registration request message, to the digital wallet of the second user.

18 Claims, 8 Drawing Sheets

(56) References Cited

U.S. PATENT DOCUMENTS

| | | |
|---|---|---|
| 2015/0228039 A1 | 8/2015 | Mahgoub et al. |
| 2020/0211099 A1* | 7/2020 | Smith .................... H04L 63/126 |
| 2021/0092108 A1* | 3/2021 | Jen .......................... G06F 21/45 |
| 2021/0218574 A1 | 7/2021 | Mao et al. |
| 2021/0256505 A1* | 8/2021 | Peng ..................... H04L 9/0894 |
| 2024/0073194 A1* | 2/2024 | Dhunay ............. G06Q 20/3821 |

FOREIGN PATENT DOCUMENTS

| | | |
|---|---|---|
| KR | 10-2015-0094547 A | 8/2015 |
| KR | 10-1591909 B1 | 2/2016 |
| KR | 102044749 B1 | 11/2019 |
| KR | 1020210091677 A | 7/2021 |
| WO | 2017033442 A1 | 3/2017 |

\* cited by examiner

```
{
    "@context":[
        ... ...
    ],
    "id": ...,  ~301
    "type": ["VerifiableCredential","DelegationCredential"],  ~302
    "issuer": ...,
    "issuanceDate": ...,
    "expirationDate": ...,  ~303
    "credentialSubject": {
        "maxDelegationDegree": ...,  ~304
        "currentDelegationDegree": ...,  ~305
        "delegateeInfo": {  ~306
            ... ...
        },
        "delegatingInfo": {  ~307
            ... ...
            "referenceCredential": {  ~308
                "id": ...  ~309
            }
            ... ...
        },
        ... ...
}
```

FIG. 3

```
401
{
  "@context":[
    ...
  ],
  "id": ..., "http://www.whonk.com/..............
  "type": ["VerifiableCredential" "DelegationCredential"],
  "issuer": ...,
  "issuer": ...,
  "issuanceDate": ...,
  "expirationDate": ...,
  "credentialSubject": {
    "delegateeInfo": {
      ......
    },
    "delegatingInfo": {
      ......
    },
    "referenceCredential": {
      "id": ...,
      ......
    },
  }
}
```
(ORIGINAL) CREDENTIAL

```
402
{
  "@context":[
    ...
  ],
  "id": ..., "did:kor:id:dad..............
  "type": ["VerifiableCredential" "DelegationCredential"],
  "issuer": ...,
  "issuer": ...,
  "issuanceDate": ...,
  "expirationDate": ...,
  "credentialSubject": {
    "delegateeInfo": {
      ......
    },
    "delegatingInfo": {
      ......
    },
    "referenceCredential": {
      "id": "http://www.whonk.com/................
      ......
    },
  }
}
```
FIRST-DEGREE DELEGATED CREDENTIAL

FIG. 4

APPARATUS AND METHOD FOR ISSUING DELEGATED CREDENTIALS IN DECENTRALIZED IDENTIFIER-BASED SERVICE

CROSS REFERENCE TO RELATED APPLICATION

This application claims the benefit of Korean Patent Application No. 10-2021-0129196, filed Sep. 29, 2021, which is hereby incorporated by reference in its entirety into this application.

BACKGROUND OF THE INVENTION

1. Technical Field

The following embodiments relate to a method and apparatus for issuing delegated credentials, which delegate verifiable credentials in a decentralized identifier (DID)-based service environment in which a user personally determines whether his or her personal information is to be used and how the personal information is to be used.

2. Description of the Related Art

Entities constituting a decentralized identifier (or identity) (DID)-based service framework are generally divided into an issuer, a holder, a verifier, and a DID registry based on the performance roles and interoperation of verifiable credentials (hereinafter referred to as "credentials").

The issuer functions to generate a credential including requirements of a user and issue the generated credential to the user, and manages information about the state of the issued credential. The holder possesses the credential, makes a verifiable presentation (hereinafter referred to as "presentation") and submits the credential to a service provider. The verifier verifies the presentation submitted by the user and provides the service assigned to the user. Further, the DID registry provides functions of storing DID documents of the issuer, the holder, and the verifier and allowing the user to query the stored documents. For example, in the DID-based service, there may be multiple issuers, multiple holders, multiple verifiers, and multiple DID registries.

Although such a DID-based service is not yet popularized in Korea, various pilot projects are currently being operated or constructed under government supervision. For example, the Gyeongsangnam-do Provincial Office has overseen a pilot project for smart inhabitant cards since 2019, and Military Manpower Administration has provided an easy authentication service since January 2020. Further, the Ministry of Public Administration and Security started to provide mobile identification cards for public offices to government employees in Sejong/Seoul government offices in January, 2021 and is scheduled to gradually expand the corresponding service to local governments. In Sejong, unlike other pilot projects, a construction project for a trusted autonomous driving platform, which is a pilot project, the range of which expands from identity authentication to the identity of things, is being conducted. It is expected that the targets of DID-based service will expand to various public/private fields in the future owing to many advantages such as the prevention of excessive leakage of personal information, reduction in social costs, and the improvement of convenience.

Meanwhile, in an offline environment, there is occasionally required the case where a delegator designates an agent (delegatee), who will work for the delegator on behalf thereof, and temporarily delegates authority and identity information to the delegatee. For example, there are examples such as a legal representative acting for authority of minors, payment for minors, adult guardianship laws, and power of attorney.

Even in a DID-based service environment, as in an offline environment, the case where a user's own credential is required to be temporarily delegated to a second user, together with power of attorney, is expected to arise. Moreover, in order to provide a DID-based service, a user may be requested by a service provider to delegate the authority to query privacy-related information such as the user's financial information or health-related information for a service subscription period.

However, "Verifiable Credentials Data Model 1.1, W3C Recommendation", which is a verifiable credential data model standard, merely describes the necessity to delegate a verifiable credential, and does not present a related model or method.

SUMMARY OF THE INVENTION

An embodiment is intended to present a delegated credential data model, which allows a user to apply a W3C verifiable credential data model standard in a Decentralized ID (DID)-based service environment.

An embodiment is intended to provide a process for configuring a hierarchical delegated credential and issuing the delegated credential.

In accordance with an aspect, there is provided a method for issuing delegated credentials between digital wallets possessed by multiple users connected to a Decentralized Identifier (DID) registry through wired/wireless communication, the method including receiving, by a digital wallet of a first user, a delegated credential issuance request message including a newly created DID document from a digital wallet of a second user, generating, by the digital wallet of the first user, a delegated credential using both the delegated credential issuance request message, received from the digital wallet of the second user, and an original credential, previously issued by the digital wallet of the first user, and transmitting, by the digital wallet of the first user, the generated delegated credential and the original credential, together with a delegated credential registration request message, to the digital wallet of the second user.

The method may further include requesting, by the digital wallet of the first user, the DID registry to check whether the DID document is duplicated, wherein, when a DID is not duplicated as a result of determining a DID duplication check response message received from the DID registry, generating the delegated credential is performed.

The original credential may include an authority desired to be delegated by the first user to the second user and delegator information.

The delegated credential may include delegatee information that is information about the second user and original credential identifier information required to refer to the original credential.

The delegated credential may include properties having a usage purpose identical to a usage purpose of a W3C verifiable data model standard that includes at least one of "@context", "id", "type", "issuer", "issuanceDate", "expirationDate" and "credentialSubject".

The method may further include, between generating the delegated credential and transmitting the generated delegated credential and the original credential to the digital wallet of the second user, initializing, by the digital wallet of the first user, issuance state information of the generated delegated credential.

The method may further include querying, by the digital wallet of the second user, the DID registry about the DID document for the delegated credential received from the digital wallet of the first user, querying, by the digital wallet of the second user, the digital wallet of the first user as to whether state information of the delegated credential is valid, verifying, by the digital wallet of the second user, a signature of the delegated credential using a public key in the DID document, when verification succeeds, requesting the DID registry to register an initially created DID document so as to be issued a newly generated delegated credential, when a response to registration of the DID document is received from the DID registry, checking a result of the registration and requesting the digital wallet of the first user to register the delegated credential, and receiving a delegated credential issuance response message from the first user.

The method may further include, when issuance of the delegated credential is issuance of an nth (n≥2) or higher-degree delegated credential, before the delegated credential is generated, selecting, by the digital wallet of the first user, an (n−1)th-degree delegated credential by which an authority to issue an nth-degree delegated credential is verifiable, and automatically selecting the original credential and first-degree to (n−2)th degree delegated credentials, wherein generating the delegated credential includes generating the delegated credential based on the selected original credential and the first-degree to (n−1)th-degree delegated credentials, and wherein transmitting the generated delegated credential and the original credential to the digital wallet of the second user includes transmitting the nth-degree delegated credential, the original credential, and all upper delegated credentials, together with the delegated credential registration request message.

Generating the delegated credential may include inputting an identifier value of the (n−1)th-degree delegated credential to an identifier property of the credential desired to be delegated in the nth-degree delegated credential.

The method may further include querying, by the digital wallet of the second user, the DID registry about the DID document for the delegated credential received from the digital wallet of the first user, querying, by the digital wallet of the second user, the digital wallet of the first user as to whether state information of the delegated credential is valid, verifying, by the digital wallet of the second user, a signature of the delegated credential using a public key in the DID document, when verification succeeds, requesting the DID registry to register an initially created DID document so as to be issued a newly generated delegated credential, when a response to registration of the DID document is received from the DID registry, checking a result of the registration and requesting the digital wallet of the first user to register the delegated credential, and receiving a delegated credential issuance response message from the first user, wherein verifying the signature of the delegated credential may include performing verification for all of the original credential and n delegated credentials.

In accordance with another aspect, there is provided a digital wallet device, including memory for storing at least one program, and a processor for executing the program, wherein the program is configured to issue a delegated credential to a digital wallet possessed by at least one additional user connected to a Decentralized Identifier (DID) registry through wired/wireless communication and to perform receiving a delegated credential issuance request message including a newly created DID document from the digital wallet of the additional user, generating a delegated credential using both the delegated credential issuance request message received from the digital wallet of the additional user and an original credential previously issued by the digital wallet device, and transmitting the generated delegated credential and the original credential, together with a delegated credential registration request message, to the digital wallet of the additional user.

The program may be configured to further perform requesting the DID registry to check whether the DID document is duplicated, and when a DID is not duplicated as a result of determining a DID duplication check response message received from the DID registry, generating the delegated credential is performed.

The original credential may include an authority desired to be delegated to the additional user and delegator information.

The delegated credential may include delegatee information that is information about the additional user and original credential identifier information required to refer to the original credential.

The delegated credential may include properties having a usage purpose identical to a usage purpose of a W3C verifiable data model standard that includes at least one of "@ context", "id", "type", "issuer", "issuanceDate", "expirationDate" and "credentialSubject".

The program may be configured to further perform, between generating the delegated credential and transmitting the generated delegated credential and the original credential to the digital wallet of the additional user, initializing issuance state information of the generated delegated credential.

The program may be configured to further perform when issuance of the delegated credential is issuance of an nth (n≥2) or higher-degree delegated credential, before the delegated credential is generated, selecting an (n−1)th-degree delegated credential by which an authority to issue an nth-degree delegated credential is verifiable, and automatically selecting the original credential and first-degree to (n−2)th-degree delegated credentials, wherein generating the delegated credential includes generating the delegated credential based on the selected original credential and the first-degree to (n−1)th-degree delegated credentials, and herein transmitting the generated delegated credential and the original credential to the digital wallet of the additional user includes transmitting the nth-degree delegated credential, the original credential, and all upper delegated credentials, together with the delegated credential registration request message.

Generating the delegated credential may include inputting an identifier value of the (n−1)th-degree delegated credential to an identifier property of the credential desired to be delegated in the nth-degree delegated credential.

In accordance with a further aspect, there is provided a digital wallet device, including memory for storing at least one program, and a processor for executing the program, wherein the program is configured to request a digital wallet possessed by at least one additional user connected to a Decentralized Identifier (DID) registry through wired/wireless communication to issue a delegated credential and receive an issued delegated credential from the digital wallet, and to perform requesting the digital wallet of the additional user to issue a delegated credential including a newly created DID document, and receiving the delegated credential and an original credential, together with a delegated credential registration request message, from the digital wallet of the additional user.

The program may be configured to further perform querying the DID registry about a DID document for the delegated credential received from the digital wallet of the additional user, querying the digital wallet of the additional user as to whether state information of the delegated credential is valid, verifying a signature of the delegated credential using a public key in the DID document, when verification succeeds, requesting the DID registry to register an initially created DID document in the DID registry so as to be issued a newly generated delegated credential, when a response to registration of the DID document is received from the DID registry, checking a result of the registration, and requesting the digital wallet of the additional user to register the delegated credential, and receiving a delegated credential issuance response message from the digital wallet of the additional user, wherein, when issuance of a delegated credential is issuance of an nth (n≥2) or higher-degree delegated credential, verifying the signature of the delegated credential includes performing verification for all of the original credential and n delegated credentials.

BRIEF DESCRIPTION OF THE DRAWINGS

The above and other objects, features, and advantages of the present invention will be more clearly understood from the following detailed description taken in conjunction with the accompanying drawings, in which:

FIG. 3 is a diagram illustrating an example of a data model of the delegated credential illustrated in FIG. 2;

FIGS. 4 and 5 are diagrams illustrating an example of hierarchical delegated credentials according to an embodiment;

DESCRIPTION OF THE PREFERRED EMBODIMENTS

Figure 1:
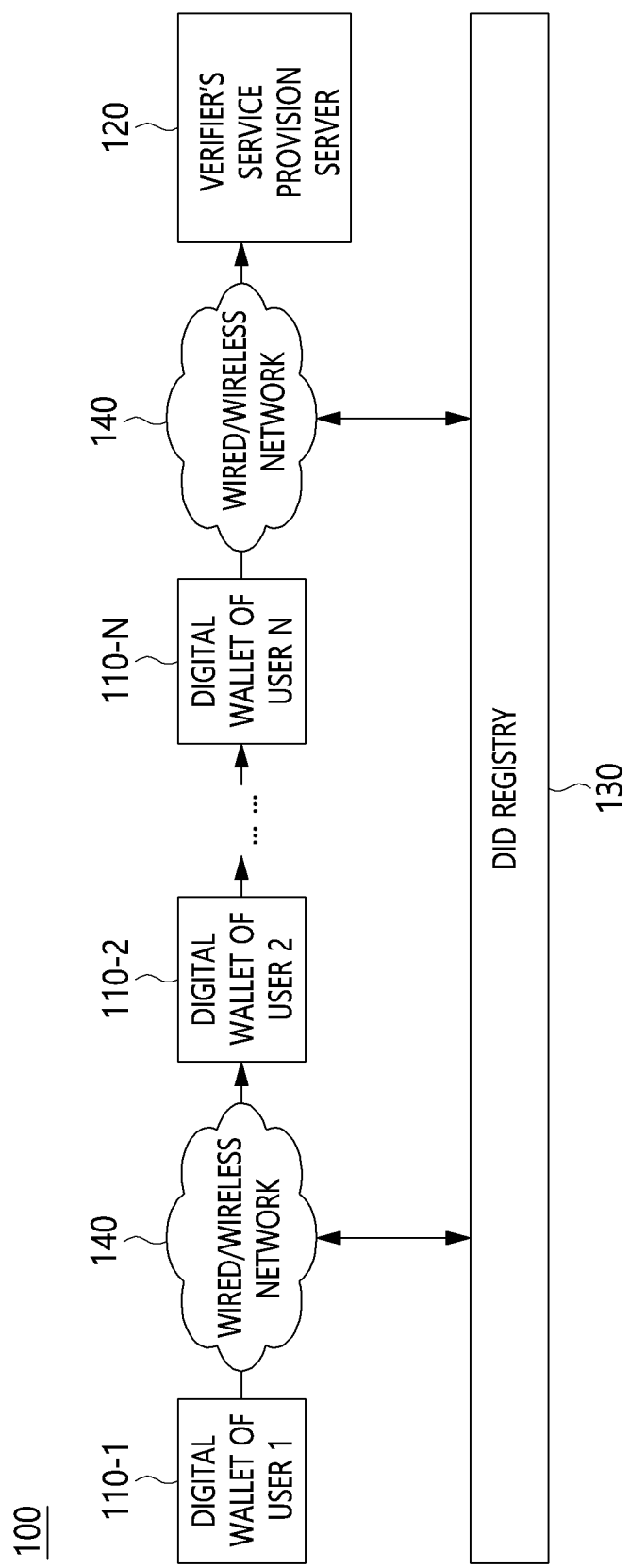
FIG. 1 is a schematic block configuration diagram of a delegated credential service framework in a DID-based service according to an embodiment.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and method for issuing delegated credentials in a DID-based service according to embodiments will be described in detail with reference to FIGS. 1 to 8.

A function of issuing delegated credentials, proposed in the present invention, means that a certain user issues a delegated credential to an additional user so as to delegate a credential, previously issued to the certain user, to the additional user.

Generally, a credential service is configured to allow businesses/institutions to issue credentials to respective users. However, the major issuance entity that issues delegated credentials may be a user, rather than a business or institutions, and a delegated credential service may be expected to be more frequently used when each user delegates his or her credentials to a secondary user other than the user himself or herself. Therefore, entities constituting a delegated credential service framework may include multiple users, and each user may be an issuer who issues a delegated credential while functioning as a holder to whom a delegated credential is issued.

FIG. 1 is a schematic block configuration diagram of a delegated credential service framework in a decentralized identifier (DID)-based service according to an embodiment.

Referring to FIG. 1, a delegated credential service framework 100 in a DID-based service according to an embodiment may be configured to include digital wallets 110-1, . . . , 110-N possessed by two or more users, a verifier's service provision server 120, and a Decentralized Identifier (DID) registry 130.

Each of the digital wallets 110-1, . . . , 110-N may be configured to store or manage credentials, and may be the hardware device of the corresponding user or software installed in a user terminal.

The DID registry 130 may refer to a server which allows each of the digital wallets 110-1, . . . , 110-N of the users to query a DID document required for issuance of delegated credentials and to acquire the DID document over a wired/wireless network 140.

For better understanding of the invention, a description will be made based on a process in which a delegation task, in which the digital wallet 110-1 of user 1 stores a previously issued credential and delegates the previously issued credential to user 2, who holds the digital wallet 110-2, is performed up to user N, by way of example.

First, the digital wallet 110-1 of user 1 issues a delegated credential so as to delegate the previously issued credential to the digital wallet 110-2 of user 2 over the wired/wireless network 140.

The digital wallet 110-2 of user 2 issues a delegated credential, required in order to re-delegate the delegated credential issued from the digital wallet 110-1 of user 1, to the digital wallet 110-3 of user 3 over the wired/wireless network 140. Such issuance of delegated credentials is applied up to user N 110-N.

Finally, the digital wallet 110-N of user N submits the issued delegated credential to the verifier's service provision server 120 over the wired/wireless network 140.

Further, the verifier's service provision server 120 verifies the submitted delegated credential and provides service to user N 110-N if it is determined that the delegated credential is valid.

In summary, the user N 110-N is provided with the service from the verifier based on authority delegated from user 1 110-1.

Figure 2:
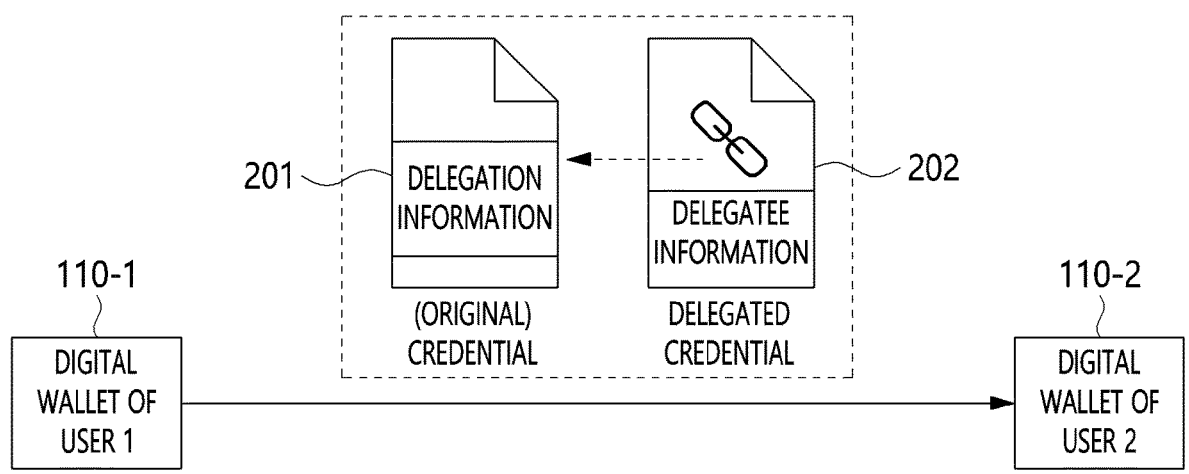
FIG. 2 is a diagram illustrating an example of configuration of a delegated credential issued to delegate a credential, issued to user 1, to user 2 according to an embodiment.

FIG. 2 is a diagram illustrating an example of the configuration of a delegated credential issued to delegate a credential previously issued to user 1 to user 2 according to an embodiment.

Referring to FIG. 2, a credential issued to user 1 is defined as an original credential 201, and a new credential to be issued to user 2 is defined as a delegated credential 202.

When the digital wallet 110-1 of user 1 generates the new delegated credential 202 based on the original credential 201 and issues the same to the digital wallet 110-2 of user 2, not only the delegated credential 202 but also the previously issued credential 201, in which the authority desired to be delegated by user 1 to user 2 is specified must be transferred together to the digital wallet 110-2 of user 2.

That is, the digital wallet 110-2 of user 2 receives both the original credential 201 and the delegated credential 202 from the digital wallet 110-1 of user 1.

In this case, the original credential 201 includes the authority desired to be delegated by user 1 to user 2 and delegator information thereof, wherein the authority and the delegator information may be defined as delegation information.

Also, the delegated credential 202 includes delegatee information that is information about user 2, and also includes original credential identifier information required to refer to the original credential.

FIG. 3 is a diagram illustrating an example of a data model of the delegated credential 202 illustrated in FIG. 2.

Referring to FIG. 3, the delegated credential data model applies a W3C verifiable data model standard, and follows a JavaScript Object Notation (JSON) format.

For this, the delegated credential data model has properties such as "@context", "id" 301, "type", "issuer", "issuanceDate", "expirationDate" 303, and "credentialSubject", and the usage purposes of the properties are identical to those of the W3C verifiable data model standard.

Here, the property "expirationDate" 303 means the expiration date of a credential in the W3C verifiable data model standard, but means a delegation date in the delegated credential model. However, since the usage purposes of the property are similar to each other, the existing property is used without change.

The value of the property "DelegationCredential" 302 is defined and inserted into the property "type" so as to indicate that the property is a delegated credential. Also, "maxDelegationDegree" 304, "currentDelegationDegree" 305, "delegateeInfo" 306, "delegatingInfo" 307, "referenceCredential" 308, and "id" 309 are properties newly defined in the delegated credential.

The property "maxDelegationDegree" 304 means the maximal delegatable degree, and must be defined in a first-degree delegated credential.

The property "currentDelegationDegree" 305 means the current delegation degree of a delegated credential, and the value thereof cannot exceed that of the property "maxDelegationDegree" 304.

The property "delegateeInfo" 306 includes delegatee information, that is, information about an entity that is issued a delegated credential, and the property "delegatingInfo" 307" includes delegation information desired to be delegated.

The delegation information may include information about a target desired to be delegated and a delegator. Also, the property "referenceCredential" 308 includes information about the original credential desired to be delegated, and the property "id" 309 allows the identifier of the original credential desired to be delegated to be inserted thereto. For example, the value of the identifier (id) 301 of the original credential 201 must be inserted into the property "id" 309 in the property "referenceCredential" 308 of the delegated credential 202 in FIG. 2.

Figure 5:
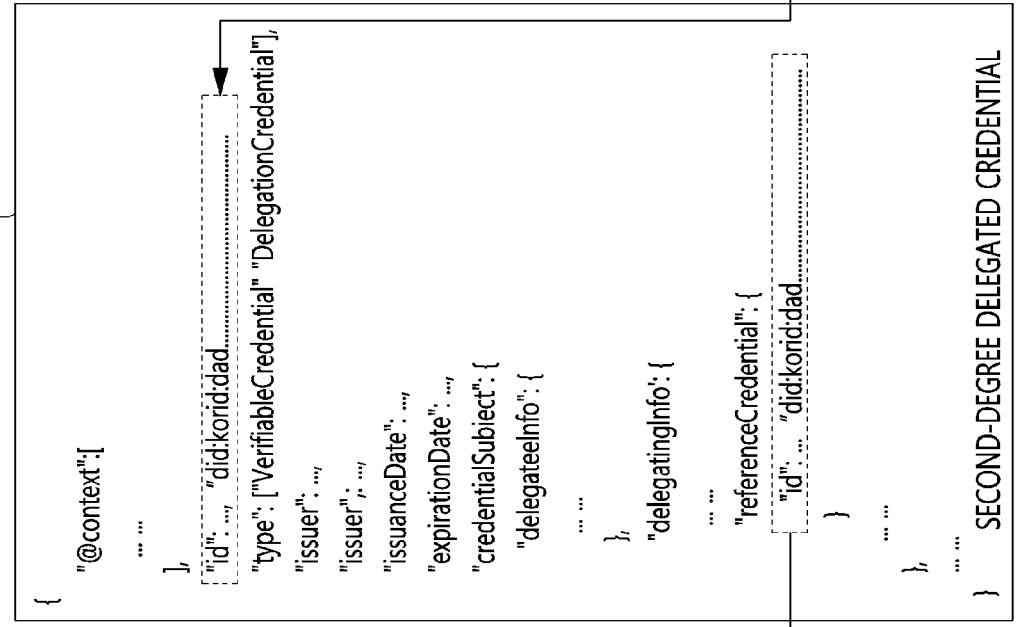

FIGS. 4 and 5 are diagrams illustrating an example of hierarchical delegated credentials according to an embodiment.

Referring to FIGS. 4 and 5, an example in which credentials ranging to an nth-degree delegated credential 404 are issued based on an original credential 401 is illustrated.

A delegated credential data model proposed in the present invention may generate successive delegated credentials by inputting the ID property value of an upper delegated credential to the identifier (ID) property 309 of the original credential of each delegated credential. Here, the degree of delegation of issuable delegated credentials is not limited.

The identifier (id) of the original credential 401 is inserted into the identifier property 309 of the original credential desired to be delegated in a first-degree delegated credential 402.

Also, in order to generate a second-degree delegated credential 403, the identifier of the first-degree delegated credential 402 is inserted into the identifier property 309 of the original credential desired to be delegated.

When delegation up to the nth-degree is performed in this way, the identifier value of an (n−1)th-degree delegated credential is inserted into the identifier property 309 of the credential desired to be delegated in the nth-degree delegated credential 404.

Figure 6:
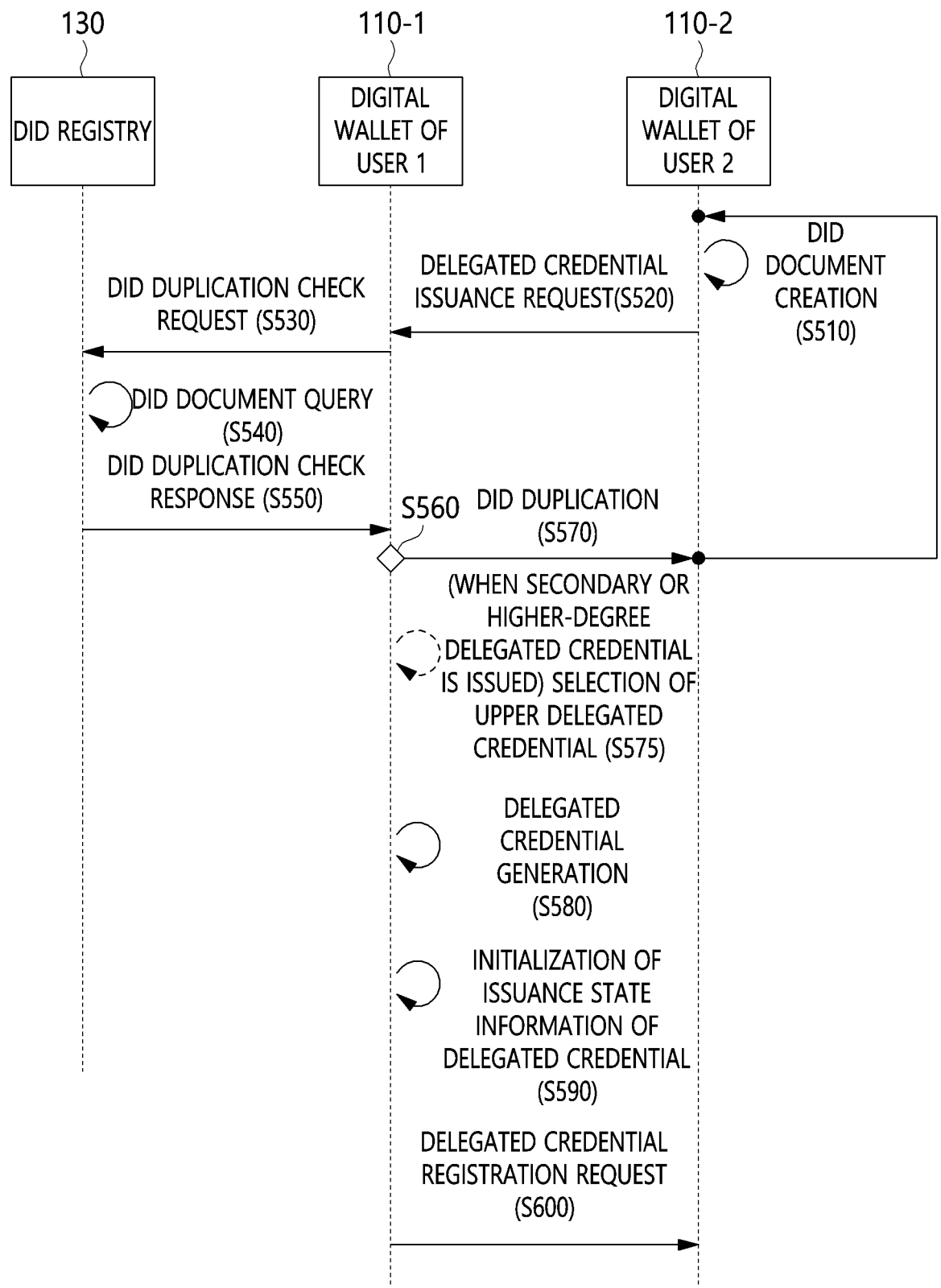
FIGS. 6 and 7 are signal flowcharts illustrating a method for issuing delegated credentials according to an embodiment.
Figure 7:
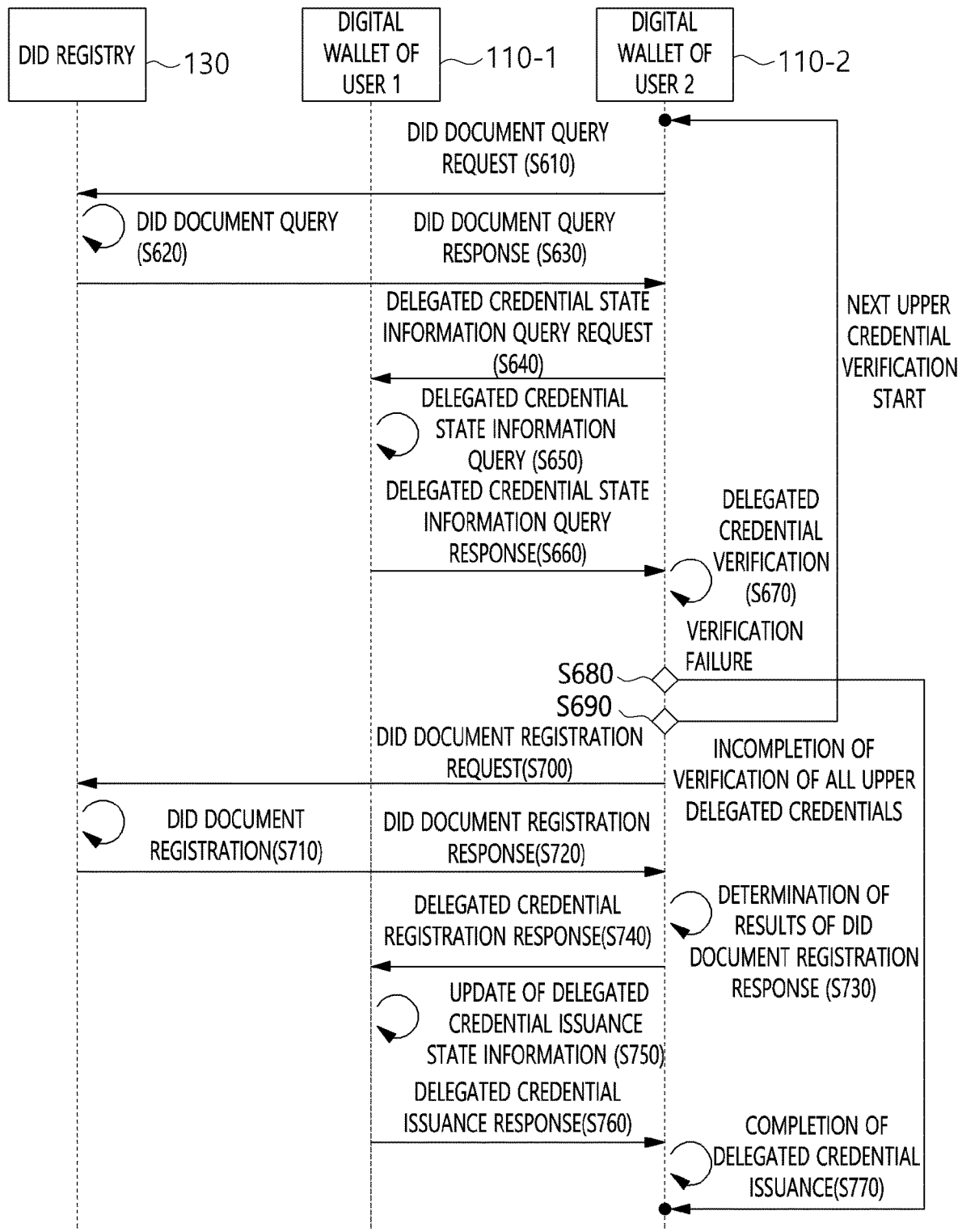

FIGS. 6 and 7 are signal flowcharts for explaining a method for issuing delegated credentials according to an embodiment.

Referring to FIG. 6, a procedure in which the digital wallet 110-1 of user 1 issues a delegated credential to the digital wallet 110-2 of user 2 is illustrated, wherein two entities are connected to a DID registry 130.

First, the digital wallet 110-2 of user 2 (hereinafter referred to as "user 2 110-2") creates a new DID document required in order to be issued a delegated credential at step S510, and sends a delegated credential issuance request message required in order to be issued a delegated credential to the digital wallet 110-1 of user 1 (hereinafter referred to as "user 1 110-1") at step S520.

The user 1 110-1 requests the DID registry 130 to check for DID duplication so as to check whether a DID in the DID document created by the user 2 110-2 is duplicated at step S530.

The DID registry 130 queries whether a DID document having the same DID as the DID included in a DID duplication check request message is present in the DID registry at step S540, generates a DID duplication check response message based on the results of the query, and returns the DID duplication check response message to the user 1 110-1 at step S550.

When a DID document having the same DID is found in the DID registry 130 at step S540, the DID duplication check response message may include information indicating that the DID cannot be registered.

Meanwhile, when a DID document having the same DID is not found in the DID registry 130 at step S540, the DID is not duplicated, and thus the DID duplication check response message may include information indicating that the DID can be registered.

Then, if a DID is duplicated as a result of determining the DID duplication check response message received from the DID registry 130 at step S560, the user 1 110-1 notifies the user 2 110-2 of duplication of DID at step S570. Accordingly, the user 2 110-2 returns to step S510 of resuming the corresponding procedure from the beginning.

Meanwhile, if DIDs are not duplicated as a result of the determination at step S560, the user 1 110-1 generates a delegated credential using both the delegated credential issuance request message received from the user 2 110-2 and information possessed by the user 1 110-1 at step S580.

Here, when the issuance of a delegated credential is the issuance of an nth (n≥2) or higher-degree delegated credential, an (n−1)th-degree delegated credential that enables verification of authority to issue an nth-degree delegated credential may be selected at step S575 before step S580. Further, for the same purpose, the original credential and the first-degree to (n−2)th-degree delegated credentials may be automatically selected. Thereafter, upon generating the delegated credential at step S580, the user 1 110-1 may generate the delegated credential based on the selected original credential and the first-degree to (n−1)th-degree delegated credentials.

The user 1 110-1 initializes issuance state information of the generated delegated credential at step S590, and thereafter transmits the nth-degree delegated credential, the original credential, and all upper delegated credentials, together with a delegated credential registration request message, to the user 2 110-2 at step S600.

Referring to FIG. 7, the user 2 110-2 requests the DID registry 130 to query a DID document corresponding to the issued nth-degree delegated credential at step S610, and the DID registry 130 queries the corresponding DID document at step S620, and sends a document query response to the user 2 110-2 at step S630.

Also, the user 2 110-2 requests the user 1 110-1 who is the delegated credential issuer to query state information as to whether delegated credential state information is valid at step S640. Then, the user 1 110-1 queries whether the delegated credential state information is valid at step S650, and sends the results of the query to the user 2 110-2 as a response at step S660.

Further, the user 2 110-2 verifies the signature of the delegated credential using a public key in the DID document at step S670.

If the result of verification at step S670 indicates a verification failure, the delegated credential issuance procedure may be stopped, or may resume from the beginning.

On the other hand, if the result of verification at step S670 indicates a verification success, the user 2 110-2 determines whether there is an upper delegated credential or an original credential referenced by the delegated credential at step S690.

If it is determined at step S690 that there is an upper delegated credential or an original credential referenced by the delegated credential, the user 2 110-2 proceeds to the step S610 of starting to verify the next upper delegated credential. That is, for successful verification, verification of all of the original credential and n delegated credentials must be completed.

If it is determined at step S690 that there is no upper delegated credential or original credential referenced by the delegated credential, that is, if verification of the original credential and all delegated credentials has succeeded, the user 2 110-2 requests the DID registry 130 to register the initially generated DID document so as to be issued a new nth-degree delegated credential at step S700.

The DID registry 130 registers the requested DID document at step S710, creates a response statement corresponding to the DID document, and transmits the response statement to the user 2 110-2 at step S720.

Then, the user 2 110-2 determines the results of the DID document registration response at step S730, and requests the user 1 110-1 who is the issuer of the nth-degree delegated credential to register the delegated credential at step S740.

After updating the issuance state of the corresponding delegated credential to a normal state at step S750, the user 1 110-1 responds to the user 2 110-2 by indicating that the delegated credential has been issued at step S760. When the delegated credential issuance response message is received from the user 2 110-2, all issuance procedures for delegated credentials are completed at step S770.

Figure 8:
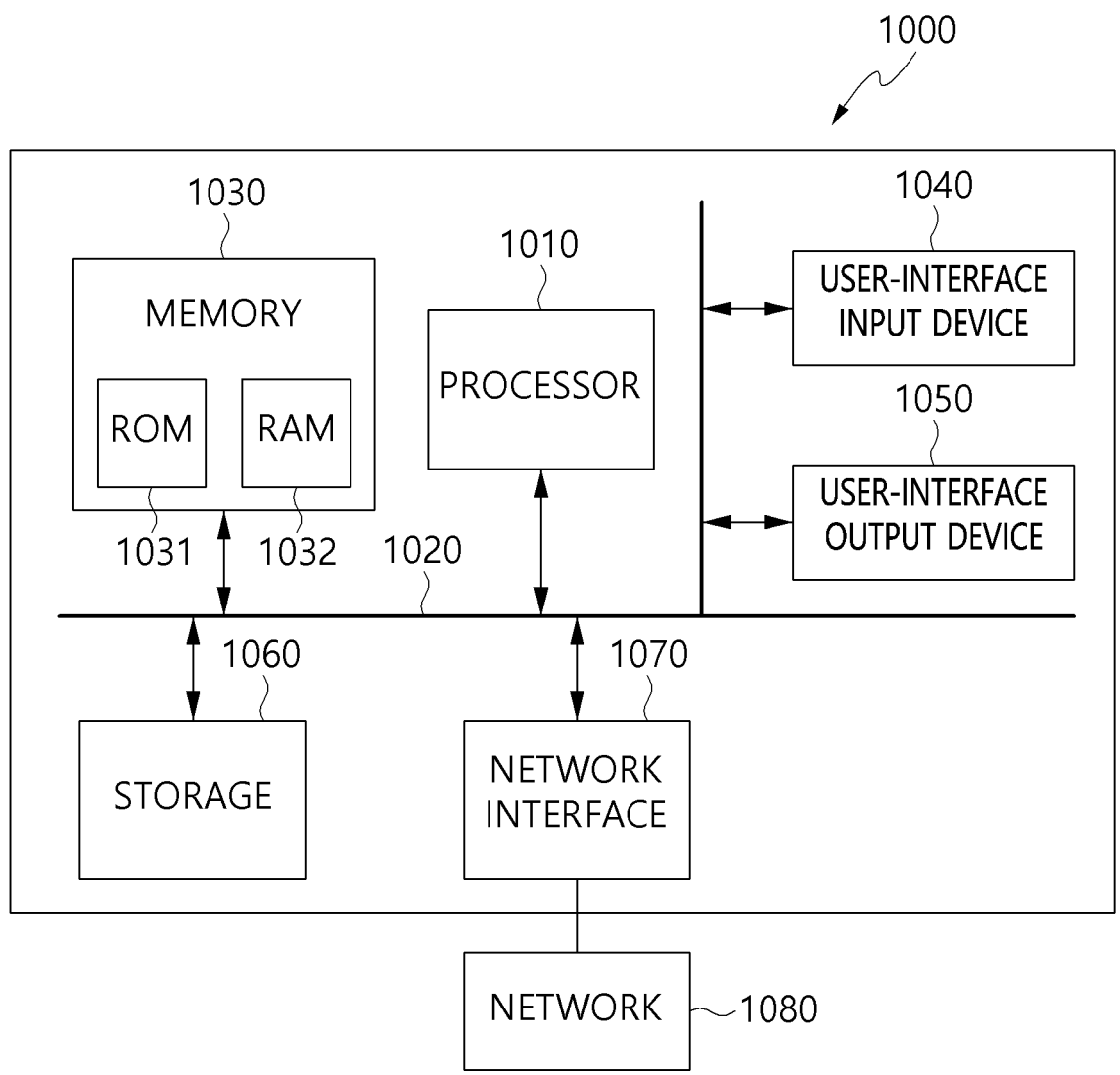
FIG. 8 is a diagram illustrating the configuration of a computer system according to an embodiment.

FIG. 8 is a diagram illustrating the configuration of a computer system according to an embodiment.

Each of digital wallets 110-1, . . . , 110-N possessed by two or more users, a verifier's service provision server 120, and a Decentralized Identifier (DID) registry 130 according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

In accordance with embodiments, a method for delegating verifiable credentials can be presented. That is, the method for delegating previously possessed verifiable credentials is first presented, and a delegated credential data model applying a W3C standard is proposed, in addition to the delegation method.

Further, in accordance with embodiments, proposed is a delegated credential data model that enables successive delegation that applies a W3C standard. That is, a delegated credential data model obtained by extending a W3C verifiable credential data model may be proposed, and successive delegated credentials may be issued without a limitation on the degree of delegation for re-delegation.

Furthermore, in accordance with embodiments, a required computational load may be linearly proportional to the degree of delegation through contextual access to delegation. That is, a proxy signature or the like by which a computational load is exponentially increased is not employed for delegation, and a scheme for enabling delegation is presented by simply contextually and additionally defining a new property in the property "credentialSubject" of a credential.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. A method for issuing delegated credentials between digital wallets possessed by multiple users connected to a Decentralized Identifier (DID) registry through wired or wireless communication, the method comprising:
   receiving, by a digital wallet of a first user, a delegated credential issuance request message including a newly created DID document from a digital wallet of a second user, the message requesting to be issued a delegated credential;
   sending, by the digital wallet of the first user, a duplication check request to the DID registry to check whether a DID in the DID document created by the second user is present in the DID registry;
   in response to the DID in the DID document is not present in the DID registry, generating, by the digital wallet of the first user, the delegated credential using the delegated credential issuance request message received from the digital wallet of the second user, multiple degrees of delegated credentials, and an original credential previously issued by the digital wallet of the first user; and
   transmitting, by the digital wallet of the first user, the generated delegated credential, the multiple degrees of delegated credentials, and the original credential, together with a delegated credential registration request message, to the digital wallet of the second user.

2. The method of claim 1, further comprising:
   requesting, by the digital wallet of the first user, the DID registry to check whether the DID document is duplicated,
   wherein, when a DID is not duplicated as a result of determining a DID duplication check response message received from the DID registry, generating the delegated credential is performed.

3. The method of claim 1, wherein the original credential includes an authority desired to be delegated by the first user to the second user and delegator information.

4. The method of claim 1, wherein the delegated credential includes delegatee information that is information about the second user and original credential identifier information required to refer to the original credential.

5. The method of claim 4, wherein the delegated credential includes properties having a usage purpose identical to a usage purpose of a World Wide Web Consortium (W3C) verifiable data model standard that includes at least one of "@context", "id", "type", "issuer", "issuanceDate", "expirationDate" and "credentialSubject".

6. The method of claim 1, further comprising, between generating the delegated credential and transmitting the generated delegated credential and the original credential to the digital wallet of the second user,
   initializing, by the digital wallet of the first user, issuance state information of the generated delegated credential.

7. The method of claim 1, further comprising:
   querying, by the digital wallet of the second user, the DID registry about the DID document for the delegated credential received from the digital wallet of the first user;
   querying, by the digital wallet of the second user, the digital wallet of the first user as to whether state information of the delegated credential is valid;
   verifying, by the digital wallet of the second user, a signature of the delegated credential using a public key in the DID document;
   when verification succeeds, requesting the DID registry to register an initially created DID document so as to be issued a newly generated delegated credential;
   when a response to registration of the DID document is received from the DID registry, checking a result of the registration and requesting the digital wallet of the first user to register the delegated credential; and
   receiving a delegated credential issuance response message from the first user.

8. The method of claim 1, further comprising:
   when issuance of the delegated credential is issuance of an nth (n≥2) degree delegated credential, before the delegated credential is generated, selecting, by the digital wallet of the first user, an (n−1)th-degree delegated credential by which an authority to issue an nth-degree delegated credential is verifiable; and
   automatically selecting the original credential and first-degree to (n−2)th degree delegated credentials, wherein generating the delegated credential comprises generating the delegated credential based on the selected original credential and the first-degree to (n−1)th-degree delegated credentials, and wherein transmitting the generated delegated credential and the original credential to the digital wallet of the second user comprises transmitting the nth-degree delegated credential, the original credential, and all upper delegated credentials, together with the delegated credential registration request message.

9. The method of claim 8, wherein generating the delegated credential comprises:
   inputting an identifier value of the (n−1)th-degree delegated credential to an identifier property of a credential to be delegated in the nth-degree delegated credential.

10. The method of claim 9, further comprising:
    querying, by the digital wallet of the second user, the DID registry about the DID document for the delegated credential received from the digital wallet of the first user;
    querying, by the digital wallet of the second user, the digital wallet of the first user as to whether state information of the delegated credential is valid;
    verifying, by the digital wallet of the second user, a signature of the delegated credential using a public key in the DID document;
    when verification succeeds, requesting the DID registry to register an initially created DID document so as to be issued a newly generated delegated credential;
    when a response to registration of the DID document is received from the DID registry, checking a result of the registration and requesting the digital wallet of the first user to register the delegated credential; and
    receiving a delegated credential issuance response message from the first user, wherein verifying the signature of the delegated credential comprises performing verification for the original credential and n delegated credentials.

11. A digital wallet device, comprising:
a memory for storing at least one program; and
a processor for executing the program, wherein the program is configured to issue a delegated credential to a digital wallet possessed by at least one additional user connected to a Decentralized Identifier (DID) registry through wired or wireless communication and to perform:
receiving a delegated credential issuance request message including a newly created DID document from the digital wallet of the additional user, the message requesting to be issued a delegated credential;
sending a duplication check request to the DID registry to check whether a DID in the DID document created by the additional user is present in the DID registry;
in response to the DID in the DID document is not present in the DID registry, generating the delegated credential using the delegated credential issuance request message received from the digital wallet of the additional user, multiple degrees of delegated credentials, and an original credential previously issued by the digital wallet device; and
transmitting the generated delegated credential, the multiple degrees of delegated credentials, and the original credential, together with a delegated credential registration request message, to the digital wallet of the additional user.

12. The digital wallet device of claim 11, wherein the program is configured to further perform:
requesting the DID registry to check whether the DID document is duplicated, and
when a DID is not duplicated as a result of determining a DID duplication check response message received from the DID registry, generating the delegated credential is performed.

13. The digital wallet device of claim 11, wherein the original credential includes an authority desired to be delegated to the additional user and delegator information.

14. The digital wallet device of claim 11, wherein the delegated credential includes delegatee information that is information about the additional user and original credential identifier information required to refer to the original credential.

15. The digital wallet device of claim 14, wherein the delegated credential includes properties having a usage purpose identical to a usage purpose of a World Wide Web Consortium (W3C) verifiable data model standard that includes at least one of "@context", "id", "type", "issuer", "issuanceDate", "expirationDate" and "credentialSubject".

16. The digital wallet device of claim 11, wherein the program is configured to further perform, between generating the delegated credential and transmitting the generated delegated credential and the original credential to the digital wallet of the additional user,
initializing issuance state information of the generated delegated credential.

17. The digital wallet device of claim 11, wherein the program is configured to further perform:
when issuance of the delegated credential is issuance of an nth (n≥2) degree delegated credential, before the delegated credential is generated, selecting an (n−1)th-degree delegated credential by which an authority to issue an nth-degree delegated credential is verifiable; and
automatically selecting the original credential and first-degree to (n−2)th-degree delegated credentials, wherein generating the delegated credential comprises generating the delegated credential based on the selected original credential and the first-degree to (n−1)th-degree delegated credentials, and wherein transmitting the generated delegated credential and the original credential to the digital wallet of the additional user comprises transmitting the nth-degree delegated credential, the original credential, and all upper delegated credentials, together with the delegated credential registration request message.

18. The digital wallet device of claim 17, wherein generating the delegated credential comprises:
inputting an identifier value of the (n−1)th-degree delegated credential to an identifier property of a credential to be delegated in the nth-degree delegated credential.

* * * * *